April 16, 1940.  H. W. KOST  2,197,220
FASTENER
Filed Dec. 14, 1938
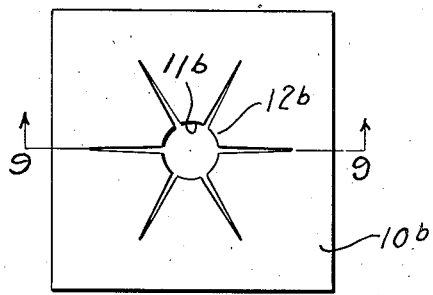
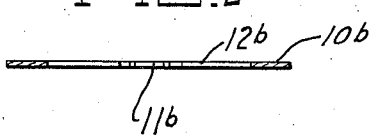
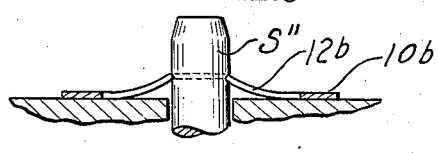
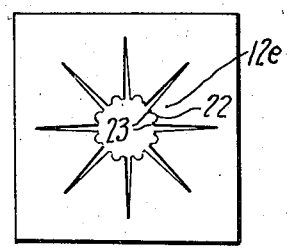
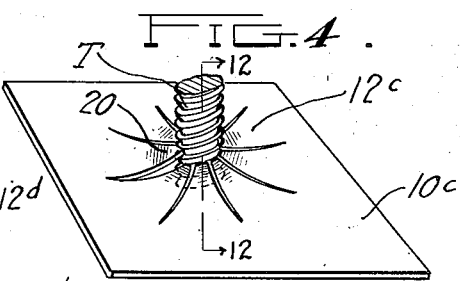
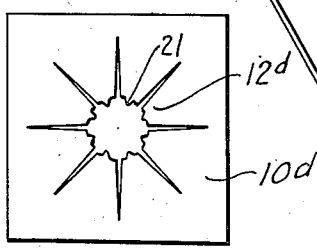
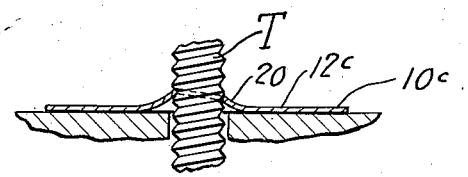
Inventor
Harold W. Kost Patented Apr. 16, 1940

2,197,220

UNITED STATES PATENT OFFICE 2,197,220

FASTENER

Harold W. Kost, Birmingham, Mich., assignor to Detroit Harvester Company, Detroit, Mich., a corporation of Michigan Application December 14, 1938, Serial No. 245,578

3 Claims. (Cl. 85—36)

This invention relates to fastening devices but more particularly to such devices for use in inaccessible or difficultly accessible places.

Fasteners of this character heretofore in use have proved difficult to apply, because of the failure of the fastener parts to yield readily upon encountering the stud or screw, or because of the trouble encountered in centering the opening in the fastener with respect to the stud in blind locations.

Objects of this invention are to overcome the above difficulties; to produce a new and improved fastener which can be more readily applied, more easily centered, is more difficult to remove, is simple and inexpensive to manufacture, and has the new and improved features of construction and arrangement hereinafter described.

Other objects and advantages of the invention will hereinafter appear and for purposes of illustration but not of limitation, embodiments of the invention are shown on the accompanying drawing in which Figure 1 is a top plan view of a fastener in which the tongues extend radially of the opening and normally lie in the plane of the body portion;

Figure 2 is a sectional view on the line 9—9 of Figure 1;

Figure 3 is a vertical sectional elevation showing the fastener of Figures 1 and 2 applied to a stud;

Figure 4 is a perspective view of another form of fastener engaged by a screw threaded member;

Figure 5 is a sectional elevation on the line 12—12 of Figure 4;

Figure 6 is a plan view of another form of fastener in which pointed teeth are formed on the free ends of the tongues; and Figure 7 is a plan view of another form of fastener in which a pair of teeth is formed on the free ends of the tongues.

In the form of the invention shown on Figures 1 to 3, the fastener is in the form of a sheet metal plate 10b formed with a plurality of integral tongues 12b arranged in an annular row, six tongues in this instance being formed in the plate by slitting the latter similar to the tongues 12 and 12a. The free ends of the tongues 12b provide an aperture 11b through which a stud or the like S'' is adapted to extend. As indicated in Figure 2, the tongues 12b are normally disposed in the plane of the body 10b but inasmuch as the diameter of the aperture 11b is somewhat smaller than the diameter of the stud S'', the tongues curve outwardly as indicated in Figure 3 when the fastener is applied to the stud. The plurality of tongues 12b arranged in this fashion affords greater flexibility to expedite in the application of the fastener to the stud and since the latter is engaged over a substantial area throughout its circumference, the holding force is considerably augmented so that the effectiveness of the fastener is thereby increased. It should be understood that these tongues assume a substantially conical form upon engagement with the stud. The tongues are resilient and intimately grip the stud substantially throughout its circumference. Preferably the metal of the tongues is harder than the metal of the stud to which it is applied so that the ends of he tongues bite into the exterior surface of the stud.

In the form of the invention shown in Figures 4 and 5, the sheet metal body 10c is formed with an annular series of tongues 12c similar to the tongues above described, the free ends being spaced from each other to provide an aperture. The free end portions 20 of the tongues 12c are formed into a substantially frusto-conical shape as indicated in Figure 5 with the edge portions being arranged progressively in helical fashion to engage the threads on the screw-threaded element T. Thus the screw-threaded element T may be readily threaded into engagement with the fastener, nearly the entire circumference of the element being engaged by the fastener for militating effectively against separation of the parts.

Another form of the invention is shown on Figure 6 in which the sheet metal body 10d is formed with a plurality of radially disposed tongues 12d similar to the arrangement shown on Figure 1. In this instance, the free end of each tongue is formed with a tooth 21 which projects outwardly from the end portion of the tongue in position to frictionally engage the stud or other member to which the fastener is applied and to bite into the surface thereof or sharply impinge thereagainst in order effectively to resist retrograde movement of the fastener with respect to the stud.

Figure 7 illustrates a fastener similar to that shown on Figure 6 except that each of the tongues 12e is formed with a notch 22 centrally thereof. This provides on the free end of each tongue a pair of teeth 23 which function similarly to the teeth 21 on Figure 6. However, by providing a plurality of teeth on the end of each of the tongues, greater resistance to rearward or retrograde movement of the fastener is afforded. Such teeth bite into the surface of the stud or intimately engage the same and militate against the parts becoming separated.

In each case, the fastener or at least the tongue portions thereof are of relatively thin sheet metal, the gauge of which will vary according to the demands of service. In many cases, the fasteners may be of high carbon steel suitably spring tempered and heat treated to give the desired toughness or hardness, particularly in the case of fasteners which are subjected to excessive vibration. Otherwise the fasteners may be formed from cold rolled stock of untempered sheet metal although the metal should be harder than that of the peripheral surface of the stud or other member to which it is applied.

Numerous changes in details of construction, arrangement and operation may be effected without departing from the spirit of the invention especially as defined in the appended claims.

What I claim is:

1. A fastener comprising a sheet metal body portion, an annular series of radially disposed integral resilient tongues on said body portion having their free ends spaced from each other to provide an aperture, and a tooth having a pointed end formed on the free end of each tongue.

2. A fastener comprising a spring tempered sheet metal body portion, an annular series of radially disposed converging resilient tongues adapted to flex to frusto-conical form upon engagement by a stud, and a plurality of teeth on the free end of each tongue having pointed ends and adapted intimately to engage the stud to which the fastener is applied.

3. A fastener comprising a spring tempered sheet metal body portion, an annular series of radially disposed converging resilient tongues adapted to flex to frusto-conical form upon engagement by a stud, and a plurality of teeth on the free end of each tongue having pointed ends and adapted intimately to engage the stud to which the fastener is applied, said teeth being formed by notching the free end portion of each tongue to form a pair of laterally spaced teeth adjacent the side edge of each tongue.

HAROLD W. KOST.